(12) United States Patent
Pihlaja et al.

(10) Patent No.: US 7,402,764 B2
(45) Date of Patent: Jul. 22, 2008

(54) MULTI-FUNCTIONAL TOUCH ACTUATOR IN ELECTRONIC DEVICES

(75) Inventors: Pekka Pihlaja, Helsinki (FI); Jari Nousiainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/387,753

(22) Filed: Mar. 22, 2006

(65) Prior Publication Data

US 2007/0221483 A1 Sep. 27, 2007

(51) Int. Cl.
*H01H 9/26* (2006.01)

(52) U.S. Cl. .................... 200/5 R; 200/512

(58) Field of Classification Search ........ 200/512–520, 200/5 R, 6 A, 181, 545; 338/47, 92, 99, 114, 338/119, 128
See application file for complete search history.

(56) References Cited

U.S. PATENT DOCUMENTS

| | | | | |
|---|---|---|---|---|
| 4,013,851 A | * | 3/1977 | Abbondante | 200/86 R |
| 4,071,724 A | * | 1/1978 | Lejeune | 200/61.25 |
| 4,257,305 A | * | 3/1981 | Friend et al. | 84/690 |
| 4,794,215 A | * | 12/1988 | Sawada et al. | 200/512 |
| 4,843,197 A | * | 6/1989 | Kojima et al. | 200/406 |
| 4,892,988 A | * | 1/1990 | Ishii | 200/516 |
| 5,313,027 A | * | 5/1994 | Inoue et al. | 200/5 A |
| 5,343,008 A | * | 8/1994 | Ipcinski | 200/302.2 |
| 6,067,005 A | | 5/2000 | DeVolpi | 338/47 |
| 6,271,491 B1 | * | 8/2001 | Ono et al. | 200/520 |
| 6,274,825 B1 | * | 8/2001 | Aaltonen et al. | 200/5 A |
| 6,548,779 B2 | * | 4/2003 | Takahashi et al. | 200/516 |
| 6,621,029 B2 | * | 9/2003 | Galmiche et al. | 200/600 |
| 6,906,274 B2 | * | 6/2005 | Ito et al. | 200/512 |
| 6,995,324 B2 | * | 2/2006 | Asada | 200/1 B |
| 7,012,208 B2 | * | 3/2006 | Wang | 200/341 |
| 7,109,431 B2 | * | 9/2006 | Yanai et al. | 200/512 |
| 7,151,236 B2 | * | 12/2006 | Ducruet et al. | 200/406 |
| 7,178,223 B2 | * | 2/2007 | Mitsuoka et al. | 29/622 |
| 7,199,321 B1 | * | 4/2007 | Huang | 200/406 |
| 7,217,893 B1 | * | 5/2007 | Huang et al. | 200/1 B |
| 2002/0112942 A1 | * | 8/2002 | Galmiche et al. | 200/5 R |

* cited by examiner

*Primary Examiner*—Michael A Friedhofer
*Assistant Examiner*—Lisa N Klaus
(74) *Attorney, Agent, or Firm*—Ware, Fressola, Van Der Sluys & Adolphson, LLP

(57) ABSTRACT

A joystick has a dome facing a flat position sensitive detector for use an electronic device. The dome is elastically mounted so that the apex of the dome rests on the detector. As the joystick is deflected, the dome and the detector roll against each other such that the apex of the dome moves to a different location of the detector surface. The joystick can be depressed to cause the dome to buckle in order to select a function of the electronic device. When the joystick is depressed, the contact area between the dome and the detector increases abruptly. After the dome is buckled, the user can exert an uneven pressure to the joystick to allow the electronic device to carry out another function.

7 Claims, 3 Drawing Sheets

MULTI-FUNCTIONAL TOUCH ACTUATOR IN ELECTRONIC DEVICES

FIELD OF THE INVENTION

The present invention relates generally to an electronic touch-device, and more particularly, to an analog joystick.

BACKGROUND OF THE INVENTION

Analog joysticks have been used on a gaming device to move an object shown on a screen and to select such an object. The traditional analog joystick has at least two potentiometers for reading the position of the joystick in X-axis and Y-axis. The joystick has a knob to guide the potentiometers for movement. In addition, the knob can be pressed, usually with the thumb of the user. The knob has a dome that buckles when the knob is pressed. The dome is a dome-switch module in the end of a mechanical stick or the like. Such an analog joystick is bulky.

It is thus advantageous and desirable to provide a less bulky joystick that can be used to shift a position in X-axis and Y-axis and to select a position.

SUMMARY OF THE INVENTION

The joystick, according to the present invention, has a dome facing a flat position sensitive detector. The dome is elastically mounted so that the apex of the dome rests on the detector. As the joystick is deflected or moved from its home position, the dome and the detector roll against each other such that the apex of the dome moves to a different location of the detector surface. Thus, the contact position between the dome and the detector shifts as the joystick is deflected. The joystick can also be used to carry out a select function by depressing the joystick to cause the dome to buckle. When the joystick is depressed, the contact area between the dome and the detector increases abruptly.

After the dome is buckled, the user is no longer able to deflect the joystick in order to shift the contact position. However, the user is able to push the keytop further with uneven pressure in order to carry out a certain function. For example, the uneven pressure can be used to effect a change in a selected function.

Thus, the first aspect of the present invention provides a pointing device which comprises:

a keytop;

a circuit board spaced from the keytop;

a dome-shaped flexible device disposed between the keytop and the circuit board, the dome-shaped flexible device having an apex;

a position sensitive detector positioned in relationship to the dome-shaped flexible device such that the apex of the dome has a contact area with the position sensitive detector at a contact position, that when the keytop is deflected, the contact position between the apex of the dome and the position sensitive detector is caused to shift while maintaining the contact area within a predetermined size, and that when the keytop is depressed toward the circuit board, the dome-shaped flexible device is caused to buckle, causing the contact area to increase beyond the predetermined size.

The dome-shaped flexible device is attached to the keytop and the position sensitive detector is disposed on the circuit board. Alternatively, the dome-shaped flexible device is disposed on the circuit board and the position sensitive detector is attached to the keytop. The position sensitive detector comprises a device for providing a signal indicative of the contact position and a detection device for detecting an uneven pressure applied to the position sensitive detector after the keytop is depressed to cause the dome-shaped flexible device to buckle.

The second aspect of the present invention provides a method to activate a keytop.

The method comprises the steps of:

disposing a dome-shaped flexible device between the keytop and a circuit board, the dome-shaped flexible device having an apex;

disposing a position sensitive detector in relationship to the dome-shaped flexible device, such that the apex of the dome has a contact area with the position sensitive detector at a contact point;

deflecting the keytop, if necessary, to shift the contact position between the apex of the dome and the position sensitive detector while maintaining the contact area within a predetermined size; and depressing the keytop toward the circuit board to cause the dome-shaped flexible device to buckle so as to increase the contact area beyond the predetermined size, wherein a signal is provided to indicate the contact point and the buckling of the dome-shaped flexible device.

The method further comprises the step of exerting an uneven pressure to the keytop after the dome-shaped flexible device is caused to buckle for changing the signal to indicate the uneven pressure.

The third aspect of the present invention provides a method to select a function on an electronic device, the electronic device having a display with a designated area for said function and a cursor which can be moved to the designated area. The method comprises the steps of:

electrically connecting a pointing device to the electronic device, the pointing device comprising:

a keytop;

a circuit board spaced from the keytop;

a dome-shaped flexible device disposed between the keytop and the circuit board, the dome-shaped flexible device having an apex;

a position sensitive detector positioned in relationship to the dome-shaped flexible device, such that the apex of the dome has a contact area with the position sensitive detector at a contact position, deflecting the keytop to shift the contact position between the apex of the dome and the position sensitive detector while maintaining the contact area within a predetermined size, wherein the shifting of the contact position causes the cursor to move, and depressing the keytop toward the circuit board when the cursor is located within the designated area for selecting the function, wherein when the keytop is depressed, the dome-shaped flexible device is caused to buckle, causing the contact area to increase beyond the predetermined size.

The method further comprises the step of exerting an uneven pressure to the keytop after the dome-shaped flexible device is caused to buckle so as to cause the electronic device to carry out a further function based on the uneven pressure.

The present invention will become apparent upon reading the description taken in conjunction with FIGS. 1 to 9.

DETAILED DESCRIPTION OF THE INVENTION

Figure 1:
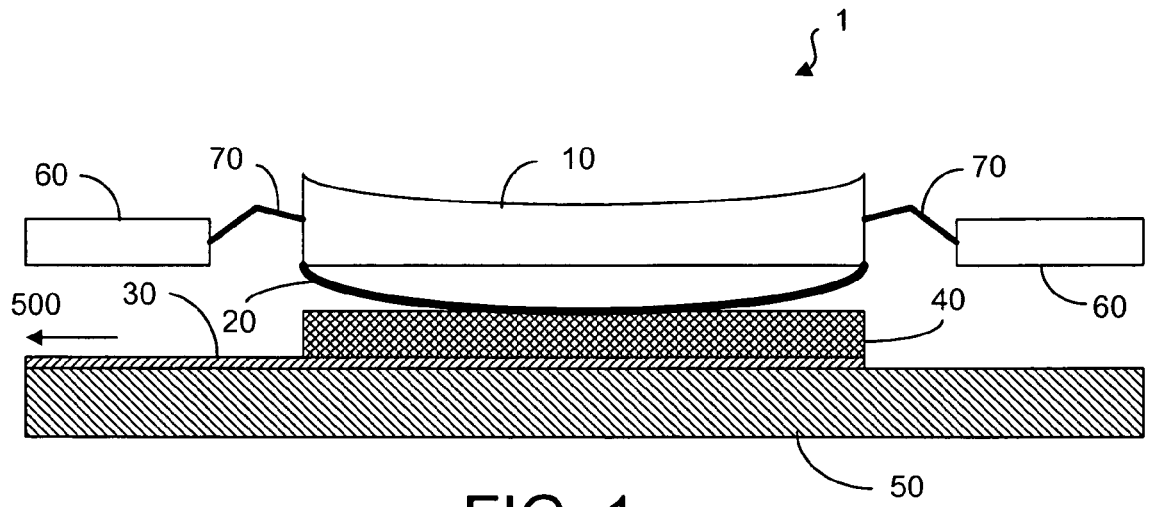
FIG. 1 shows the joystick, according to the present invention, in its non-deflected position or home position.
Figure 2:
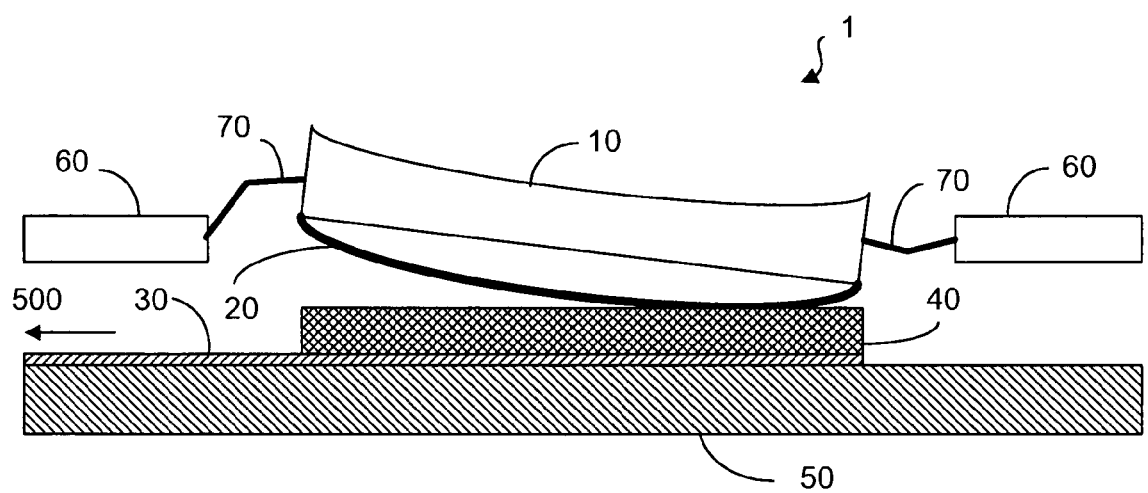
FIG. 2 shows the joystick in a deflected position.

The joystick 1, according to the present invention, comprises a keytop 10 and a flexible dome 20 securely attached to the keytop 10. As shown in FIG. 1, the keytop 10 is elastically connected to a device cover 60 by an elastic mounting member 70. Below the dome is a position sensitive detector 30 and a circuit board such as a printed wire board 50. Preferably, a protective surface layer such as a rubber pad 40 is placed on top of the position sensitive detector 30 so that the dome apex makes contact with the position sensitive detector 30 through the rubber pad 40. In this embodiment, the dome is inverted such that the dome apex rests at a contact area on the position sensitive detector 30. Preferably, the position sensitive detector 30 is substantially flat such that when the joystick is deflected, the dome 20 and the position sensitive detector 30 roll against each other, causing the position of their contact to shift, as shown in FIG. 2.

Figure 3:
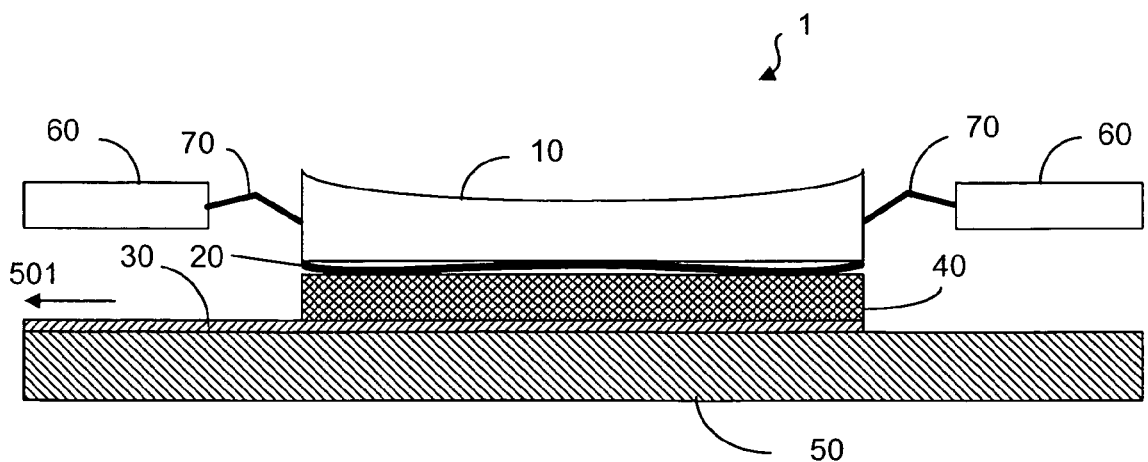
FIG. 3 shows the joystick being depressed when it is in the non-deflected position.

When the joystick 1 is used to carry out a select function, the user simply pushes the keytop 10 downward, causing the dome to buckle as shown in FIG. 3. The buckling of the dome can be detected by the position sensitive sensor as the contact area between the dome and the position sensitive sensor increases abruptly. When the dome is buckled, it usually lies flat against the positive sensitive detector 30. For that reason, it may be difficult to deflect the dome after the joystick is depressed. However, it may be possible to depress the joystick with an uneven force while the joystick in a depressed position.

Figure 4:
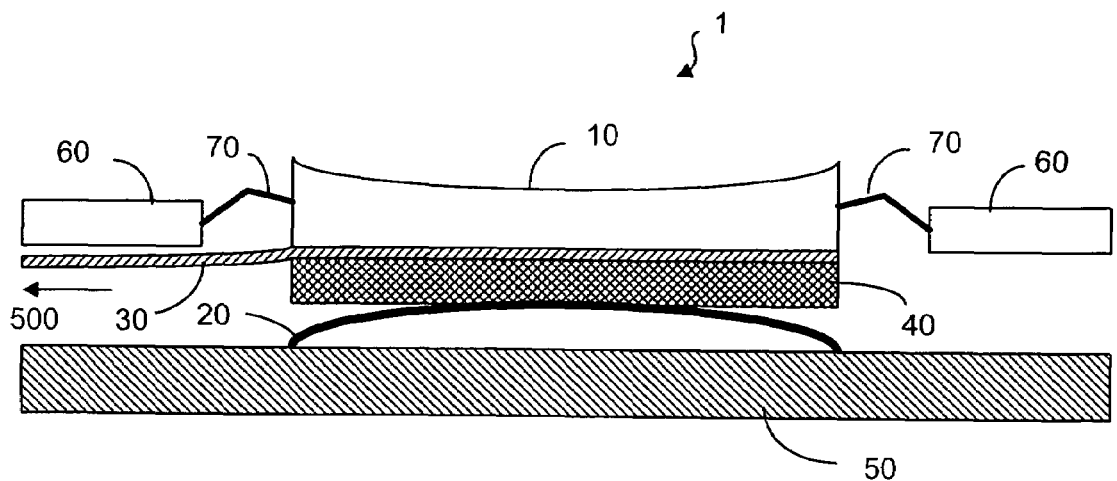
FIG. 4 shows the joystick, according to another embodiment of the present invention, in its non-deflected position.
Figure 5:
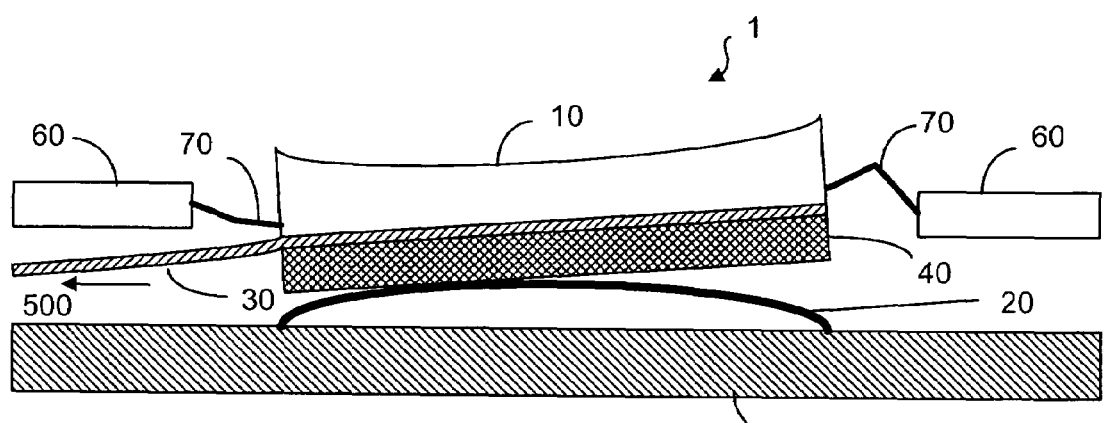
FIG. 5 shows the joystick of FIG. 4 in a deflected position.
Figure 6:
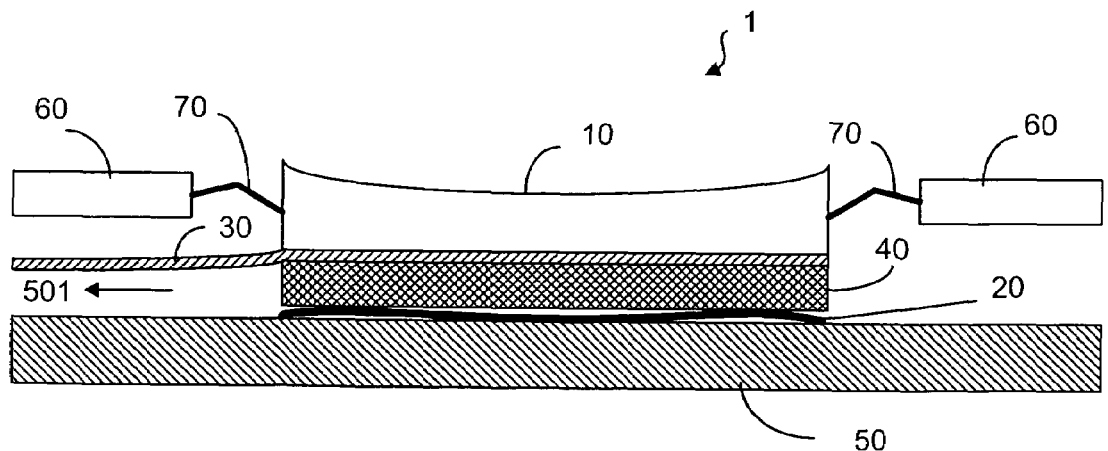
FIG. 6 shows the joystick of FIG. 4 is a depressed position.

In another embodiment of the present invention, the dome 20 is attached to the printed wire board 50 and the position sensitive detector 30 is attached to the keytop 10, as shown in FIG. 4. In this embodiment, the apex of the dome 20 is facing the keytop 10. When the joystick 1 is deflected, the dome 20 and the position sensitive detector 30 also roll against each other, causing the position of their contact to shift, as shown in FIG. 5. When the joystick 1 is depressed, it causes the dome 20 on the printed wire board 50 to buckle, as shown in FIG. 6. The buckling of the dome also causes the contract area between the dome and the position sensitive detector to increase abruptly. In this embodiment, if the dome is electrically conductive, its buckling can cause a galvanic contact of the dome on the printed wire board. As such, the buckling of the dome can be either detected by the position sensitive detector due to abrupt increase of the contact area, or by the galvanic contact on the printed wire board.

After the dome is buckled, the user is no longer able to deflect the joystick in order to shift the contact position. However, it is possible for the user to push the keytop 10 further with uneven pressure in order to exert a sideways force. According to the present invention, the uneven pressure can be used to carry out a certain function. For example, if the selected function is brightness adjustment, the user can carry out the following steps:

deflecting the joystick to move the cursor to the displayed "brightness" icon;

depressing the joystick to cause the dome to buckle in order to select the "brightness" function;

exerting a sideways force to one side of the joystick to increase the brightness or to the other side to decrease the brightness.

releasing the joystick to terminate the selection.

Figure 7:
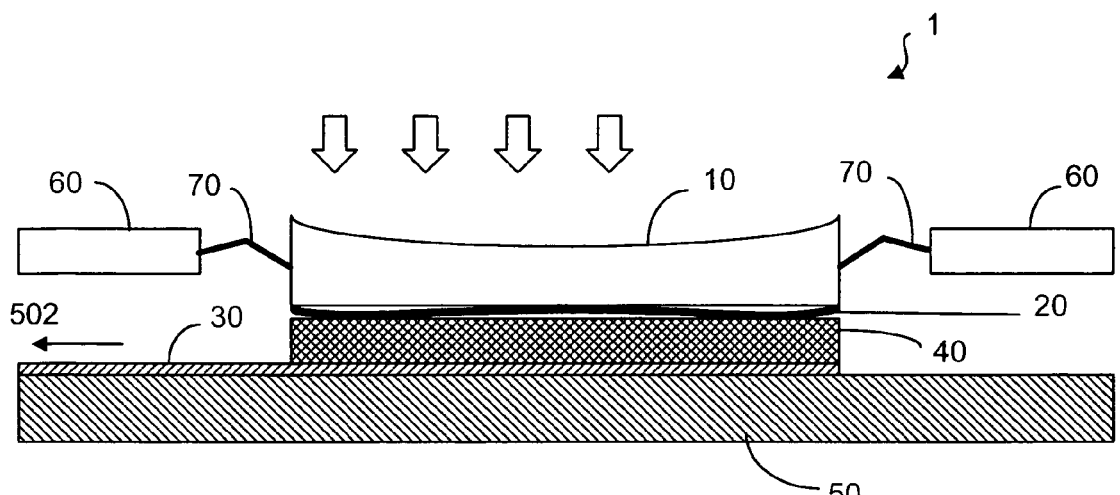
FIG. 7 is a schematic representation of the joystick of FIG. 3 being depressed further in order to exert an uneven pressure on the position sensitive sensor.
Figure 8:
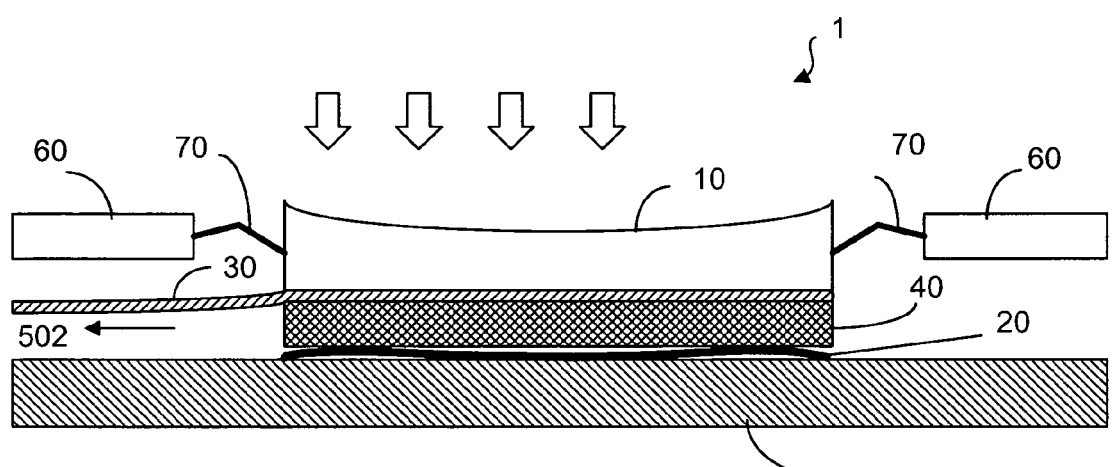
FIG. 8 is a schematic representation of the joystick of FIG. 6 being depressed further in order to exert an uneven pressure on the position sensitive sensor.
Figure 9:
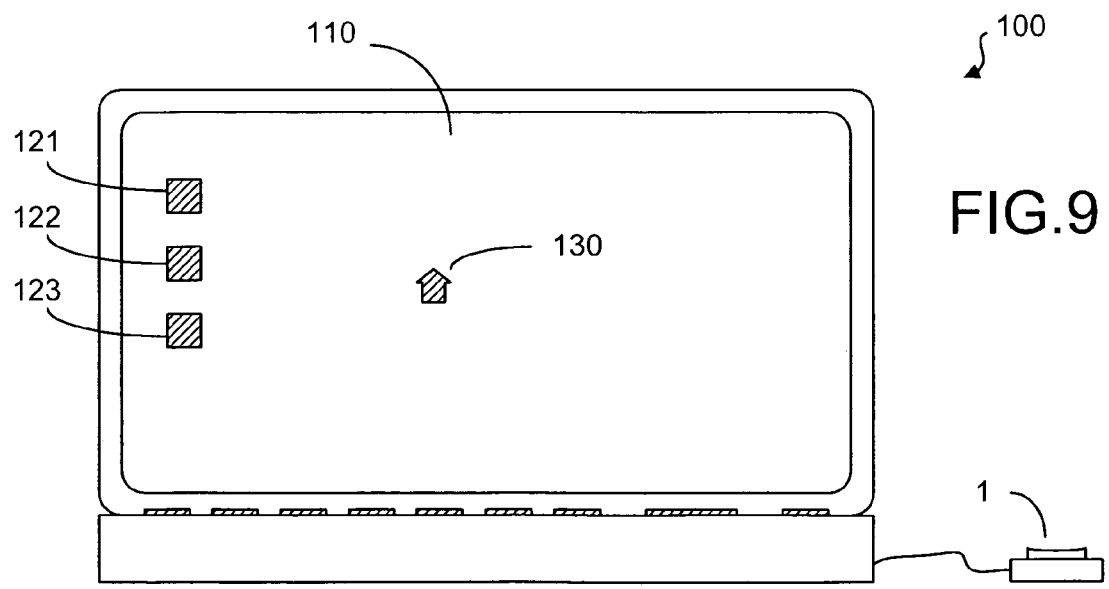
FIG. 9 is a schematic representation of an electronic device electrically connected to the joystick of the present invention.

FIGS. 7 and 8 illustrate the uneven contact pressure between the buckled dome 20 and the position sensitive sensor 30 when the joystick is pushed further. FIG. 9 shows an electronic device such as a computer or a television set 100 have a display 110. On the display 110, a number of icons 121, 122, 123 are displayed at designated areas to allow a user to select a function by moving the cursor 130 to the desired function. The electronic device 100 is electrically connected to the joystick 1, according to the present invention so as to allow a user to move the cursor 130 and to select a function as specified by the icon.

In general, when the dome is buckled, the user is able to receive a tactile response through the pressing figure. Depending on the material, it is possible to produce a mechanical click when the dome is depressed.

It should be noted that the position sensitive detector 30 is known in the art and is not part of the present invention. For example, a pressure sensor with one or more force-sensitive variable-resistive strips can be used for position sensing purposes. The sensor is effectively composed of a number of sub-circuits derived from the layering of a piezo-resistive substrate, for example, so that the sensor is able to provide an electronic signal 500 indicative of the position sensed by the sensor, a changed signal 501 indicative of the increased contact area and a different signal 502 indicative of an uneven pressure exerted on the position sensitive detector after the dome is depressed.

Although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A pointing device comprising:

a keytop;

a circuit board spaced from the keytop;

a dome-shaped flexible device disposed between the keytop and the circuit board, the dome-shaped flexible device having an apex and a shape;

a position sensitive detector positioned in relationship to the dome-shaped flexible device such that the apex of the dome has a contact area with the position sensitive detector at a contact position, that when the keytop is deflected, the contact position between the apex of the dome and the position sensitive detector is caused to shift while maintaining the shape of the dome-shaped flexible device and maintaining the contact area within a predetermined size, and that when the keytop is depressed toward the circuit board, the shape of the dome-shaped flexible device is caused to change and the contact area is caused to increase beyond the predetermined size.

2. The pointing device of claim 1, wherein when the keytop is depressed, the dome-shaped flexible device is caused to buckle, causing the contact area to increase beyond the predetermined size.

3. The pointing device of claim 1, wherein the dome-shaped flexible device is attached to keytop and the position sensitive detector is disposed on the circuit board.

4. The pointing device of claim 1, wherein the dome-shaped flexible device is disposed on the circuit board and the position sensitive detector is attached to the keytop.

5. The pointing device of claim 1, wherein the position sensitive detector comprises a device for providing a signal indicative of the contact position.

6. The pointing device of claim 1, wherein the position sensitive detector comprises a detection device for detecting an uneven pressure applied to the position sensitive detector after the keytop is depressed to cause the dome-shaped flexible device to buckle.

7. The pointing device of claim 6, wherein the position sensitive detector comprises means for providing a signal indicative of the uneven pressure.

* * * * *